Patented June 7, 1938

2,119,526

UNITED STATES PATENT OFFICE 2,119,526

Δ₁-ALKENYL CYANOACETIC ESTERS AND METHOD OF PRODUCING SAME

Arthur C. Cope, Bryn Mawr, Pa., Walter H. Hartung, Baltimore, Md., and Frank S. Crossley, Philadelphia, Pa., assignors to Sharp & Dohme, Incorporated, Philadelphia, Pa., a corporation of Maryland (1929)

No Drawing. Application October 15, 1936, Serial No. 105,822

15 Claims. (Cl. 260—99.30)

This invention relates to new derivatives of cyanoacetic esters. It relates more particularly to Δ₁-alkenyl cyanoacetic esters, and includes not only these new products, but also the novel process by which they may be produced.

The new compounds with which this invention is concerned may be represented by the following graphic formula:

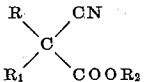

in which R is a Δ₁-alkenyl radical, which may be primary or secondary, R₁ is an alkyl radical, an aralkyl radical, an aryl radical, a cyclohydrocarbon radical, such as cyclohexyl or cyclopentyl, or other hydrocarbon or substituted hydrocarbon radical, and R₂ is an alkyl radical, or the like. The Δ₁-alkenyl group, represented by R, in general has the following structure:

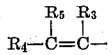

in which any two of the radicals R₃, R₄ and R₅ may be hydrogen, but at least one of them must be an alkyl group, saturated or unsaturated. If R₃ is hydrogen, the Δ₁-alkenyl group is referred to herein as a "primary Δ₁-alkenyl" group; if R₃ is an alkyl group, the Δ₁-alkenyl group is referred to herein as a "secondary Δ₁-alkenyl" group.

The new products are advantageously prepared by the alkylation of the corresponding alkylidene cyanoacetic esters, in the course of which the double bond uniting the alkylidene group and the cyanoacetic ester group is shifted to the Δ₁ position, so that the alkylidene group is changed, by isomerization or other means, to the corresponding alkenyl group with the double bond in the Δ₁ position, as shown in the equation:

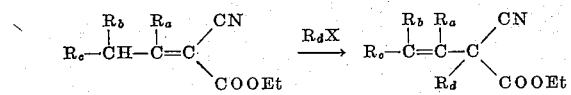

The Δ₁-alkenyl group in these alkenyl cyanoacetic esters can vary widely, as all of the primary and secondary alkylidene cyanoacetic esters, with the exception of the ethylidene compound, can be readily transformed into corresponding Δ₁-alkenyl cyanoacetic esters by the novel process of this invention, and the range of alkenyl esters which may be produced is limited only by the availability of the various alkylidene cyanoacetic esters.

The Δ₁-alkenyl cyanoacetic esters, whether the alkenyl group is primary or secondary, are new products, many of which, particularly the primary derivatives, are useful as intermediates for the production of Δ₁-alkenyl barbituric acids and thiobarbituric acids, by the condensation of urea or thiourea with the corresponding cyanoacetic ester, with subsequent replacement of the imino group, by an oxygen atom, by hydrolysis; and are also useful for the production of unsaturated acids, by the removal of the nitrile group.

In accordance with the process of the invention, the alkylidene cyanoacetic esters may be subjected, in solution, to alkylation with a suitable alkyl or aralkyl halide, sulfate, or other salt, in the presence of a sodium alkoxide, such as sodium methoxide or sodium ethoxide. In the reaction which takes place, the double bond of the alkylidene cyanoacetic ester shifts to the Δ₁ position in the alkenyl group, and the alkyl or aralkyl group of the halide, sulfate or other salt becomes attached to the methylene carbon of the malonic ester.

The invention will be further illustrated by the following specific examples, but it is not limited thereto.

*Example 1.*—Preparation of 1-n-propyl Δ₁-butenyl ethyl cyanoacetic methyl ester,

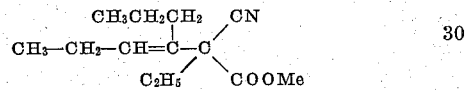

Into a suitable reaction vessel equipped with a mechanical stirrer, a reflux condenser, a dropping funnel and a thermometer are placed 300 parts of dry ether, containing 33.1 parts of sodium ethoxide. The solution is cooled below 0° C. by means of an ice-salt mixture and 105 parts of 1-n-propyl-butylidene cyanoacetic ester are slowly added, with agitation, at such a rate that the temperature of the mixture does not rise above 0° C. After all of the ester has been added, the stirring is continued for some time and then 85 parts of diethyl sulfate are added in one portion. The molar ratio of the cyanoacetic ester and the diethyl sulfate used is 10 to 11. After the diethyl sulfate is added, the cooling bath is removed and the reaction mixture is rapidly warmed to the refluxing temperature, at which time a more or less vigorous reaction takes place. Care should be taken that the reaction is not allowed to proceed too rapidly. When the reaction starts, sodium ethyl sulfate precipitates from the solution. The refluxing and stirring are continued for about 8 to 14 hours, and the mixture is allowed to stand overnight. It is then diluted with about 2 volumes of water, the organic layer is separated, and the aqueous layer extracted with several portions of benzene, about 300 parts in all, and the combined organic layer and benzene extract are washed with water. The benzene is then removed at somewhat reduced pressure, and the product is purified by distillation. It has a boiling range of 117 to 119° C./4 mm.

*Example 2.*—Preparation of 1-n-propyl Δ1-n-butenyl allyl cyanoacetic methyl ester,

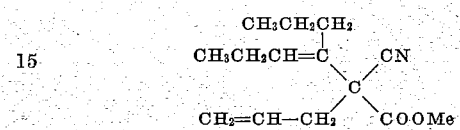

Allyl bromide, 1-n-propyl-butylidene cyanoacetic methyl ester and sodium methoxide, in approximately the same molar ratios as in Example 1, are reacted under substantially the same conditions as in Example 1, using methanol as the solvent. The desired product is isolated and purified by distillation. It has a boiling range of 125–126° C./4 mm.

*Example 3.*—Preparation of allyl isopropenyl cyanoacetic ethyl ester,

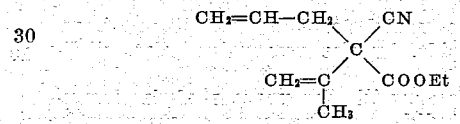

30 parts of allyl bromide, 28.5 parts of isopropylidene cyanoacetic ester and 12.7 parts of sodium ethoxide are reacted in 80 parts of absolute alcohol, as in Example 2. The above product is isolated and purified by distillation.

In the processes of the foregoing examples, various alkyl or aralkyl salts, such as the sulfates, halides, etc. may be used for the alkylation of the alkylidene cyanoacetic esters, with the production of alkyl Δ1-alkenyl cyanoacetic esters, in the presence of sodium methoxide or sodium ethoxide or other alkoxides. Where the halides are used as alkylating agents, it is preferable to use the more reactive bromides and iodides, as they give somewhat better yields, but the chlorides may be used if desired. Various solvents, including inert solvents such as ether, benzene, etc., and the alcohols, such as methanol, absolute alcohol, propanol, etc., may be used. When alkyl or aralkyl sulfates are used as alkylating agents, such solvents as ether and benzene are preferably used. In general, if an alcohol is used as the solvent, it is advantageous to use the same alcohol as was used in esterifying the cyanoacetic acid, to avoid the production of mixed esters.

The groups which may be so introduced include not only the primary alkyl groups, but also the secondary alkyl groups, such as the isopropyl or secondary butyl groups, as well as unsaturated alkyl groups, such as the allyl, crotyl or citronellyl groups, aralkyl groups, such as benzyl and the like, cyclic groups, such as the cyclohexyl or cyclopentyl group, etc.

The alkylidene cyanoacetic esters, from which the Δ1-alkenyl alkyl cyanoacetic esters are prepared in accordance with the process of the present invention, include both the primary and secondary alkylidene cyanoacetic esters, which may be produced in any suitable manner; but which are most advantageously produced in accordance with the process described in application Serial No. 105,825, filed October 15, 1936, of Arthur C. Cope, which application describes the production of such compounds by the condensation of an aldehyde or ketone with cyanoacetic ester in the presence of a soluble salt, a condensing agent which gives good results being piperidene acetate.

Among the new Δ1-alkenyl cyanoacetic esters which may be prepared by the process of the present invention, and which are new products, useful as intermediates in the production of other products, are compounds in which the Δ1-alkenyl radical may be one of the following: Δ1-n-propenyl, isopropenyl, Δ1-butenyl (normal or iso), Δ1-pentenyl (normal or iso), Δ1-hexenyl (normal or iso), Δ1,3-butadienyl, Δ1,7-1,3-dimethyl octadienyl (citronellenyl), 1-methyl-Δ1-n-propenyl, 1-ethyl-Δ1-n-propenyl, 1-n-propyl-Δ1-n-butenyl, 1-n-butyl-Δ1-n-pentenyl, and others, and in which the other linkage of the methylene carbon of the cyanoacetic radical may be attached to one of the following radicals:

Methyl, ethyl, propyl (normal and iso), butyl (normal, iso or secondary), allyl, crotyl, citronellyl, cinnamyl, amyl (normal, iso or secondary), hexyl (normal, iso or secondary), cyclohexyl, cyclopentyl, phenyl-ethyl, benzyl, heptyl (normal, iso or secondary) and others.

These new products may be prepared by other processes than that described above, for example, by reacting the alkylidene cyanoacetic esters and the alkylating salts in an inert solvent in the presence of metallic sodium. In this application, we claim the process of producing the new Δ1-alkenyl alkyl cyanoacetic esters by the reaction of an alkylidene cyanoacetic ester with an alkylating agent, such as an alkyl or aralkyl salt, in the presence of sodium alkoxide, such as sodium methoxide, or sodium ethoxide; and we also claim the new products. The terms "alkenyl", and "alkylidene", as used in this specification and the appended claims, are to be construed in their narrow sense, as including only open-chain aliphatic radicals, although these may be saturated or unsaturated.

We claim:

1. Δ1-alkenyl cyanoacetic esters.
2. Primary Δ1-alkenyl cyanoacetic esters.
3. Secondary Δ1-alkenyl cyanoacetic esters.
4. Compounds of the class consisting of alkyl and aralkyl Δ1-alkenyl cyanoacetic esters.
5. Compounds of the class consisting of alkyl and aralkyl primary Δ1-alkenyl cyanoacetic esters.
6. Compounds of the class consisting of alkyl and aralkyl secondary Δ1-alkenyl cyanoacetic esters.
7. Compounds of the formula

in which $R_1$, $R_2$ and $R_3$ are radicals of the class consisting of hydrogen and alkyl groups, but at least one is alkyl, $R_4$ is a hydrocarbon residue, and $R_5$ is alkyl.

8. Ethyl-1-n-propyl-Δ1-butenyl cyanoacetic esters.
9. Allyl 1-n-propyl Δ1-butenyl cyanoacetic esters.
10. Allyl isopropenyl cyanoacetic esters.
11. The process of preparing Δ1-alkenyl cyanoacetic esters which comprises reacting an alkylidene cyanoacetic ester with an alkyl or aralkyl salt in the presence of an alkali metal alkoxide.
12. The process of preparing Δ1-alkenyl cyanoacetic esters which comprises reacting an alkylidene cyanoacetic ester with an alkyl or aralkyl halide in the presence of an alkali metal alkoxide.

13. The process of preparing Δ1-alkenyl cyanoacetic esters which comprises reacting an alkylidene cyanoacetic ester with an alkyl or aralkyl salt in the presence of sodium ethoxide.

14. The process of preparing Δ1-alkenyl cyanoacetic esters which comprises reacting in alkylidene cyanoacetic ester with an alkyl or aralkyl salt in the presence of an alkali metal alkoxide in an inert solvent.

15. The process of preparing Δ1-alkenyl cyanoacetic esters which comprises reacting an alkylidene cyanoacetic ester with an alkyl or aralkyl salt in the presence of sodium ethoxide in an inert solvent.

ARTHUR C. COPE.
WALTER H. HARTUNG.
FRANK S. CROSSLEY.

DISCLAIMER 2,119,526.—*Arthur C. Cope*, Bryn Mawr, Pa., *Walter H. Hartung*, Baltimore, Md., and *Frank S. Crossley*, Philadelphia, Pa. $\Delta_1$-ALKENYL CYANOACETIC ESTERS AND METHOD OF PRODUCING SAME. Patent dated June 7, 1938. Disclaimer filed October 14, 1939, by the assignee, *Sharp & Dohme, Incorporated*.

1. Hereby disclaims from claim 11 of said Letters Patent all processes which do not include the preparation of a secondary $\Delta_1$-alkenyl cyanoacetic ester by reacting a corresponding alkylidene cyanoacetic ester with an alkyl or aralkyl salt in the presence of an alkali metal alkoxide.

2. Hereby disclaims from claim 12 of said Letters Patent all processes which do not include the preparation of a secondary $\Delta_1$-alkenyl cyanoacetic ester by reacting a corresponding alkylidene cyanoacetic ester with an alkyl or aralkyl halide in the presence of an alkali metal alkoxide.

3. Hereby disclaims from claim 13 of said Letters Patent all processes which do not include the preparation of a secondary $\Delta_1$-alkenyl cyanoacetic ester by reacting a corresponding alkylidene cyanoacetic ester with an alkyl or aralkyl salt in the presence of sodium ethoxide.

4. Hereby disclaims from claim 14 of said Letters Patent all processes which do not include the preparation of a secondary $\Delta_1$-alkenyl cyanoacetic ester by reacting a corresponding alkylidene cyanoacetic ester with an alkyl or aralkyl salt in the presence of an alkali metal alkoxide in an inert solvent.

5. Hereby disclaims from claim 15 of said Letters Patent all processes which do not include the preparation of a secondary $\Delta_1$-alkenyl cyanoacetic ester by reacting a corresponding alkylidene cyanoacetic ester with an alkyl or aralkyl salt in the presence of sodium ethoxide in an inert solvent.

6. Hereby disclaims claims 1, 2, 4, 5, and 7.

[*Official Gazette November 7, 1939.*]